Oct. 24, 1961  C. J. McKINNEY  3,005,658
WINDOW PANE GUIDE
Filed Dec. 31, 1958                    2 Sheets-Sheet 1
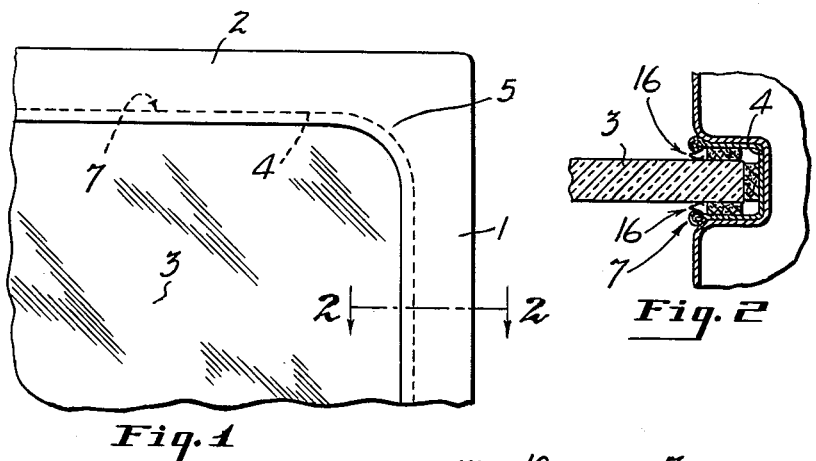
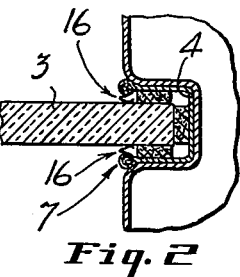
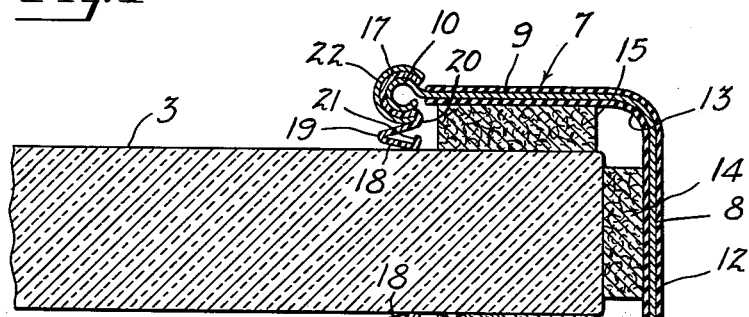
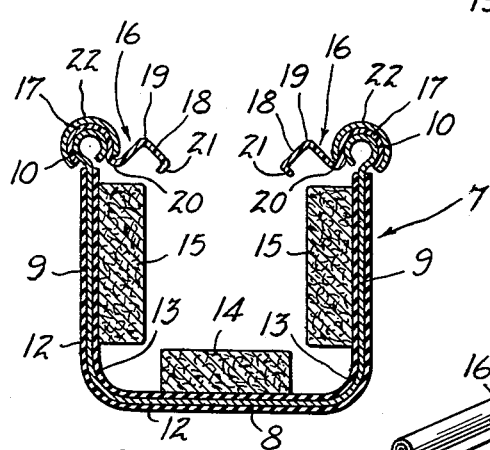
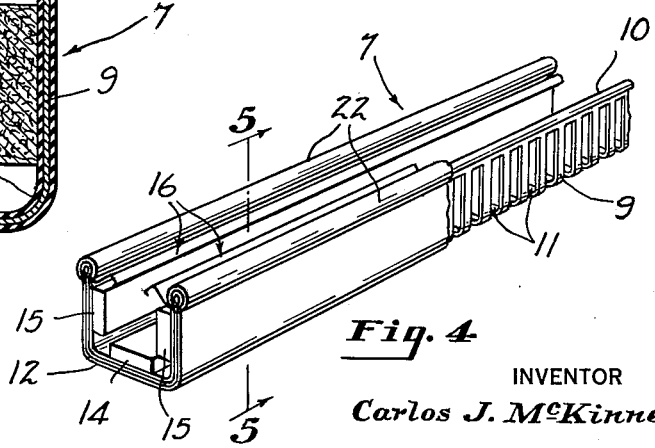
INVENTOR
Carlos J. McKinney
BY McCoy, Greene + LeGrotenhuis
ATTORNEYS Oct. 24, 1961  C. J. McKINNEY  3,005,658
WINDOW PANE GUIDE
Filed Dec. 31, 1958  2 Sheets-Sheet 2
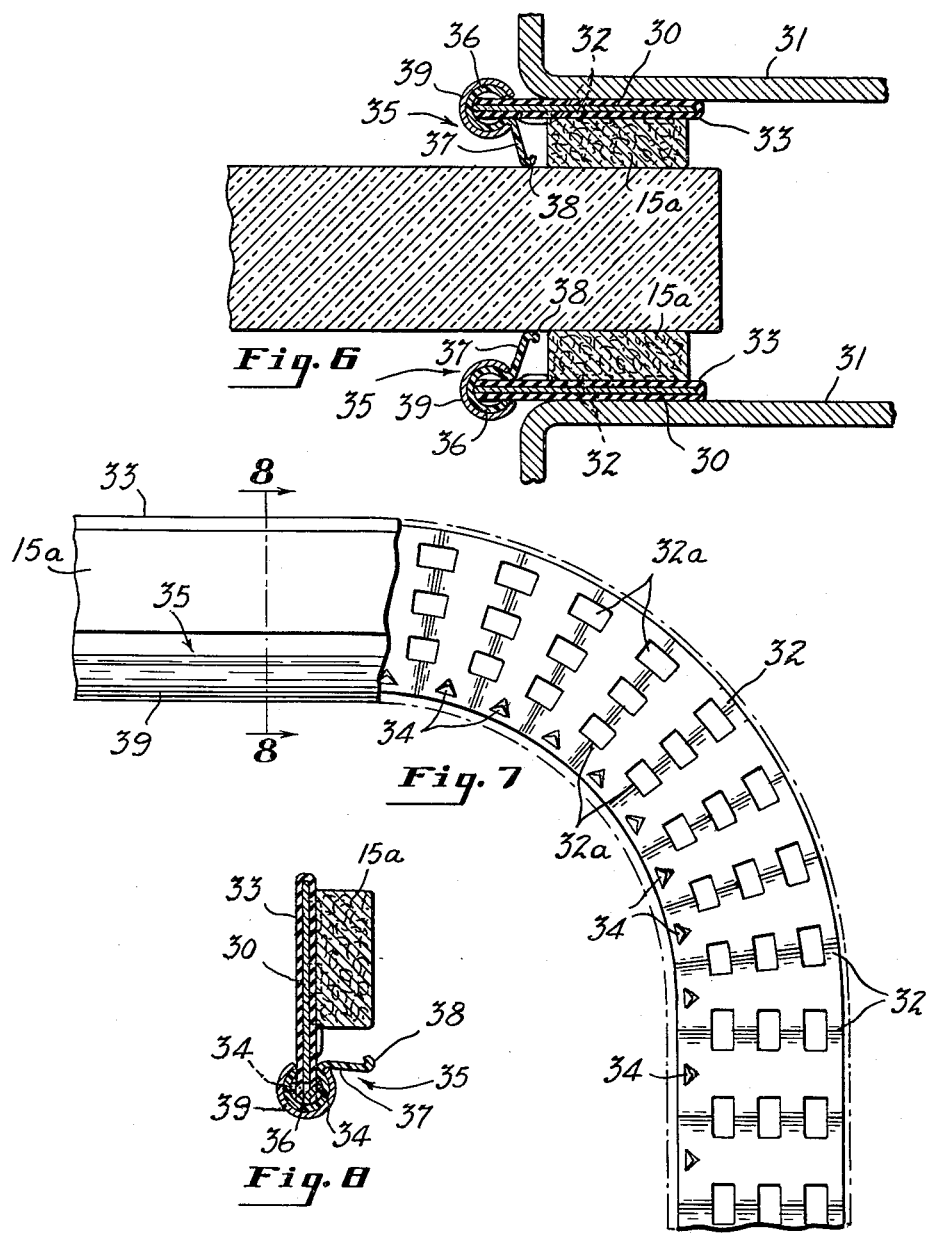
INVENTOR
Carlos J. McKinney
BY
McCoy, Greene & LeGrotenhuis
ATTORNEYS 3,005,658
Patented Oct. 24, 1961

3,005,658
WINDOW PANE GUIDE
Carlos J. McKinney, Detroit, Mich., assignor to The General Tire & Rubber Company, Akron, Ohio, a corporation of Ohio
Filed Dec. 31, 1958, Ser. No. 784,344
8 Claims. (Cl. 296—44.5)

This invention relates to window pane guides of the type used in automobile windows for guiding sliding glass panes which provide a weather seal and which protect glass from damage due to the impacts and vibrations to which an automobile body may be subjected.

Guides of the type referred to are designed for mounting in grooves or recesses at the margin of the window opening and are provided with a base member of bendable sheet material that is provided with slots, corrugations or the like to facilitate bending thereof to conform to a corner of the window opening. The base member, which may be flat or channel shaped, may be faced with cushioning strips of felt, pile fabric, or sponge rubber for engagement with the glass pane, to cushion the glass against shocks of impact and vibrations and to provide a weather seal when the window is closed.

The improvement of the present invention resides in the provision of a flexible and resilient sealing strip attached to the base member and engageable with the glass at the margin of the window opening to close the space between a glass pane and a side of the glass receiving recess, the sealing strip serving to improve the weather seal when the window is closed and to prevent entry of moisture into the glass receiving recess when the window is closed.

The sealing strip is formed of flexible and resilient sheet material which preferably has a low coefficient of friction and which is so shaped and so attached to the base member that it can be bent with the base member without substantial distortion. The material of the sealing strip is preferably a plastic such as a vinyl or polyvinyl chloride, a vinyl chloride acetate, a polyethylene or a polytetrafluorethylene.

The sealing strip of the present invention is attached to an edge portion of a base member and extends inwardly from said edge for engagement with the side face of a glass pane. When the base member is in the form of a channel a sealing strip is attached to the edge of each of the channel side walls. The strips are collapsible and so disposed that they will be partially collapsed and spread apart when a glass pane is inserted between them and will maintain a pressure on the opposite faces of the glass pane.

The outer edge portion of each sealing strip is in the form of a channel that receives an edge of the base member that is formed with a bead or other enlargement for retaining the strip. A trim bead of a resilient plated sheet metal such as commonly employed to cover the edges of the base channel may fit over the channel portion of the sealing strip to clamp the same to the beaded edge of the side wall.

The sealing strip is so formed that when mounted the flexible inwardly projecting glass engaging portion projects inwardly in a direction substantially perpendicular to the edge portion of the base member so that the sealing strip will bend with the edge of the base member to which it is attached to the same curvature as the said edge without substantial distortion at the bend.

Reference should be had to the accompanying drawings forming a part of this specification, in which:

FIGURE 1 is a fragmentary side elevation of a window to which the invention is applied;

FIG. 2 is a section taken on the line indicated at 2—2 in FIG. 1;

FIG. 3 is a section on an enlarged scale through an edge portion of the glass pane and a channel guide in which it is mounted;

FIG. 4 is a perspective view of the channel with a portion of the outer covering broken away to show the bendable base member;

FIG. 5 is a section on an enlarged scale taken on the line indicated at 5—5 in FIG. 4;

FIG. 6 is a sectional view showing a modified form of sealing strip and a mounting in which the glass pane is received between sealing guide strips;

FIG. 7 is a side elevation of a portion of a guide strip with a portion of the cushioning and sealing strips broken away to show the bendable backing strip; and FIG. 8 is a section taken on the line indicated at 8—8 in FIG. 7.

In FIGS. 1 to 5 of the accompanying drawings the invention is shown applied to an automobile door window having side members formed by a stile 1 and top rail 2 of the door which receive a glass pane 3. To accommodate the glass pane, the stile 1 and rail 2 have a groove 4 that extends throughout the length of the stile 1 and the top rail 2 and around the interior of a rounded corner portion 5. The groove 4 receives a glass run channel 7 which fits in the groove 4 along one side and across the top of the window opening and which is bent to conform to the rounded corner 5.

The channel has a bendable channel-shaped sheet metal base member consisting of a bottom or base 8 and side walls 9 that have a shouldered edge in the form of rounded beads 10. The base member may be formed in various ways, as is well understood in the art to facilitate the bending thereof without distortion to conform to the curved corner 5. As shown in FIG. 4, the walls 8 and 9 of the base member may be provided with transversely extending slots 11 which permit bending of the base member without substantial distortion about a transverse axis toward which the open side of the channel faces so that the beaded edges 10 will be substantially concentric with the bottom 8 at the rounded corner 5.

The walls 8 and 9 of the sheet metal base member are preferably covered exteriorly and interiorly with thin sheets 12 and 13 of rubber or plastic that are sufficiently stretchable to permit the bending of the channel and cushioning strips 14 and 15 of pile fabric, felt, sponge rubber or other suitable cushioning material are attached to the inner faces of the bottom and side walls of the channel.

Adjacent the open side of the channel, collapsible glass engaging sealing strips 16 are provided which are formed of thin resilient and flexible sheet material, preferably one of the well known flexible plastic sheet materials. The sealing strips 16 normally project past the inner faces of the strips 15 and engage opposite faces of the glass pane 3 to provide an additional weather seal and also serve to protect the cushioning strips 14 and 15 for preventing entry of moisture to the cushioning strips when the window is closed. Excessive moisture tends to deteriorate the cushioning strips and freezing of moisture saturated cushioning strips destroys their cushioning action. The sealing strips are preferably of identical construction, each provided along its outer edge with a rounded retaining channel 17 along one edge that fits upon one of the beads 10 and a body portion integral with the channel 17, joined thereto along the inner edge of the inner wall of the channel 17, and provided with a longitudinal corrugation 18 inwardly of and parallel to the channel 17 that is collapsible to maintain pressure against the glass pane 3. The corrugation 18 has flat sides and a central peak or ridge 19. The strip 16 is also provided with a sharp bend 20 at the outer edge of the corrugation 18 where the outer side of the corrugation 18 joins the inner side wall of the channel 17. The sharp bends 19 and 20 provide hinge lines about which the strip bends when pressure is applied to its inner edge and the resistance of the resilient strip to such bending serves to maintain pressure against the faces of the glass pane 3 when it is received between the sealing strips 16 as shown in FIG. 5. The inner edge portion of each of the strips 16 has an inturned portion 21 which serves to stiffen the inner wall of the corrugation 18 and which provides a rounded edge for engagement with the glass pane 3.

The channels 17 of the strips 16 may be covered by resilient trim strips 22 which extend the full length of the channel and which fit over the channel portions 17 of the sealing strips. The strips 22 may be the usual plated trim strips that are commonly employed to cover the edge portions of the glass receiving channels. The sealing strips 16 and trim strips 22 may be assembled on the base channel by sliding them endwise upon the beads 10. The inner glass engaging edges of the sealing strips 16 are normally spaced apart a distance less than the thickness of the glass pane 3 so that when the glass pane is inserted between the strips 16 the corrugations 18 are partially collapsed by bending along the lines 19 and 20 so that the resistance to bending of the resilient strip about the lines 19 and 20 maintains a pressure against the glass engaging edges thereof. The depth of the corrugation 18 is substantially the same as the depth of the channel 17 and bead 10, so that when the strips 16 are secured in place on the beads 10 the inwardly projecting portions of the strips 16 extend inwardly from the side walls in a direction generally perpendicular to the side walls 9, the corrugations 18 being disposed substantially in transverse alinement with the beads 10 so that when the cushioning strips 16 are bent with the channel 7 to the same curvature as the beads 10 in the corner portion 5 the variation in the curvature of different portions of the strip will not be sufficient to cause substantial distortion of the bent strip.

FIGS. 6, 7 and 8 of the drawings show a modified construction in which substantially flat base members 30 that may be attached to side walls 31 of a glass receiving recess at the margin of a window opening in an automobile body are shown. The base members 30 may be provided with transverse corrugations 32 intersecting spaced rectangular slots 32a to permit the base members to be bent in its plane, as more fully disclosed in my Patent No. 635,915 granted April 21, 1953. Each backing member may be provided with a thin covering 33 of rubber or plastic and integral oppositely projecting lugs 34 adjacent an edge of the backing struck up from the body thereof, provide a shouldered edge. A resilient sealing strip 35 preferably formed of a flexible plastic sheet material has a rounded retaining channel 36 that receives the retaining lugs 34. The strip 35 is slidable on the shouldered edge of the base member and the open side of the channel is of a width less than that of the shouldered edge portion of the base member to retain the sealing strip on the base member.

Each strip 35 has an inwardly projecting glass engaging body portion 37 integral with the retaining channel 36 which extends inwardly in a direction generally perpendicular to the base member 30 when the strip 35 is mounted on the base member 30 so that the strip will bend with the base member 30 and assume the curvature of the edge of the member 30 to which it is attached without substantial distortion. As shown in FIG. 6 the width of the glass engaging portions 37 is such that, when in place in the window, the portions 37 are deflected by the glass pane sufficiently to maintain an effective sealing engagement with the opposite faces of the pane. The resistance of the resilient strip to bending about the line of connection between the body portion 37 with the inner wall of the channel 36 maintains pressure on the glass engaging edge of the body 37. The inner edges of the glass engaging portion 37 of each strip 35 may be provided with a short inturned edge portion 38 which stiffens the strip and provides a rounded edge for engagement with the glass pane. A trim strip 39 may be employed to cover the channel 36. The channel 36 slidably receives the shouldered edge of the base member 30 so that the strip 35 can adjust itself to a shouldered edge that has been shortened by bending. A cushioning strip 15a may be attached to the face of each base member 30 inwardly of the strip 35, and the strip 35 or 37 normally projects beyond the glass engaging face of the strip 15a as shown in FIG. 8. As shown in FIG. 6, identical guide members with sealing strips 35 and cushioning strips 15a may engage opposite faces of a glass pane.

It is to be understood that in accordance with the provisions of the patent statutes, variations and modifications of the specific devices herein shown and described may be made without departing from the spirit of the invention.

What I claim is:

1. A guide for a sliding glass pane comprising a base member having a generally flat wall and formed for bending in its plane about an axis spaced therefrom and perpendicular thereto, and a one piece glass engaging sealing strip of resilient flexible plastic sheet material having a longitudinally continuous side edge portion attached to an edge portion of said wall and a longitudinally continuous bridging portion for bridging the space between said wall and a glass pane, said bridging portion and said attaching portion having angularly disposed portions connected along a longitudinal line about which the strip can flex when subjected to pressure between said wall and a glass pane and said bridging portion having a free glass engaging edge parallel to said longitudinal line, said glass engaging edge and said longitudinal line lying in a plane substantially perpendicular to said wall for bending with said base member substantially without distortion to the curvature of the edge of the wall to which it is attached.

2. A guide as claimed in claim 1 in which the edge of the wall to which the sealing strip is attached is shouldered and in which said strip has a longitudinal channel that receives said shouldered edge and that has sides that converge to a longitudinal opening of less width than said shouldered portion.

3. A guide as claimed in claim 1 in which the bridging portion of the sealing strip is substantially flat.

4. A guide as claimed in claim 1 in which a glass engaging cushioning strip is secured to the base member inwardly of said sealing strip.

5. A window guide comprising a base member having a substantially flat wall provided with a shouldered edge, said base member being bendable in the plane of said wall to conform to a corner and adjoining sides of a window opening, and a one piece sealing strip of flexible and resilient plastic sheet material formed with a longitudinally continuous retaining channel at its outer edge that receives said shouldered edge and a lonigtudinally continuous laterally projecting portion provided with a glass engaging edge parallel with said channel, said retaining channel having sides that converge to a longitudinal opening of a width less than that of said shouldered edge to retain said strip on said backing member, said projecting portion having a longitudinal corrugation of uniform depth alongside said channel, said sealing strip lying substantially perpendicular to said wall for bending with said base member without substantial distortion to the curvature of the edge of the wall to which it is attached and having sharp longitudinal bends parallel with said glass engaging edge at the juncture of the inner edge of said channel and the outer edge of said corrugation and along the peak of said corrugation to facilitate uniform collapse of said corrugation by engagement of the face of a glass pane with said glass engaging edge.

6. The window guide as claimed in claim 5 in which a glass engaging cushioning strip is secured to said backing member inwardly of said sealing strip and in which said sealing strip normally projects past the glass engaging face of said cushioning strip.

7. In a glass run channel of the type having a channel-shaped base member with generally flat parallel side walls and formed for bending about an axis perpendicular to said walls and cushioning means within said base member for engagement with a glass pane, the combination therewith of a sealing strip interposed between each side wall and the glass pane outwardly of said cushioning means and lying substantially perpendicular to said walls, each of said sealing strips being formed of flexible and resilient plastic sheet material, having an outer continuous longitudinal edge portion secured to a side wall of said base member and being bendable with said base member substantially without distortion, a continuous collapsible bridging portion having a longitudinal corrugation inwardly of said outer edge portion and a glass engaging inner edge portion, the inner edge portions of said sealing strips being normally spaced apart a distance less than the thickness of the glass pane, whereby said corrugations are partially collapsed and maintain pressure on said glass engaging edge portions when said edges are spread apart by the glass pane.

8. In a glass run channel of the type having a channel-shaped base member with generally flat parallel side walls and formed for bending about an axis perpendicular to said walls and cushioning means within said base member for engagement with a glass pane, the combination therewith of a sealing strip interposed between each side wall and the glass pane outwardly of said cushioning means, each of said sealing strips being formed of flexible and resilient plastic sheet material and having a continuous outer longitudinal edge portion secured to a side wall of said base member, a continuous collapsible bridging portion having a longitudinal corrugation inwardly of said outer edge portion and a longitudinally continuous glass engaging inner edge portion, each of said sealing strips having sharp longitudinal bends that provide hinge lines along the outer edge and along the center of its corrugation, the outer edge portion of each sealing strip being in the form of a channel that fits over the edge of a side wall of the base member, said sealing strips lying substantially perpendicular to said side walls and being bendable with said base member without substantial distortion and being disposed with their corrugations and wall engaging channels substantially in transverse alinement and the inner glass engaging edges of said strips being normally spaced apart a distance less than the thickness of said glass pane, whereby said corrugations are partially collapsed and maintain pressure on said glass engaging edge portions when said edges are spread apart by said glass pane.

References Cited in the file of this patent

UNITED STATES PATENTS

| | | |
|---|---|---|
| 1,934,816 | Randall | Nov. 14, 1933 |
| 1,978,911 | Reid | Oct. 30, 1934 |
| 2,182,687 | Bailey | Dec. 5, 1939 |
| 2,635,915 | McKinney | Apr. 21, 1953 |